(No Model.)

H. L. GARDNER.
TROLLEY CYCLE.

No. 526,832.    Patented Oct. 2, 1894.

Witnesses
E. C. Stickney.
E. G. Gifford.

Inventor
Henry L. Gardner
By Allen Webster
Attorney

THE NORRIS PETERS CO., PHOTO-LITHO., WASHINGTON, D. C.

UNITED STATES PATENT OFFICE.

HENRY L. GARDNER, OF SPRINGFIELD, MASSACHUSETTS.

TROLLEY-CYCLE.

SPECIFICATION forming part of Letters Patent No. 526,832, dated October 2, 1894.

Application filed January 18, 1894. Serial No. 497,249. (No model.)

*To all whom it may concern:*

Be it known that I, HENRY L. GARDNER, a citizen of the United States of America, residing at Springfield, in the county of Hampden and State of Massachusetts, have invented new and useful Improvements in Trolley-Cycles, of which the following is a specification, reference being had to the accompanying drawings and letters of reference marked thereon, in which drawings like letters of reference indicate like parts.

Figure 1:
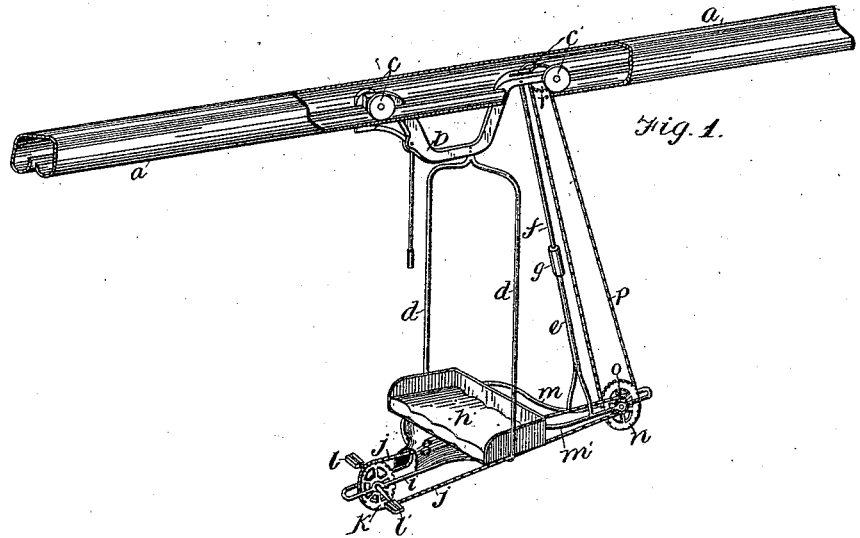
Figure 2:
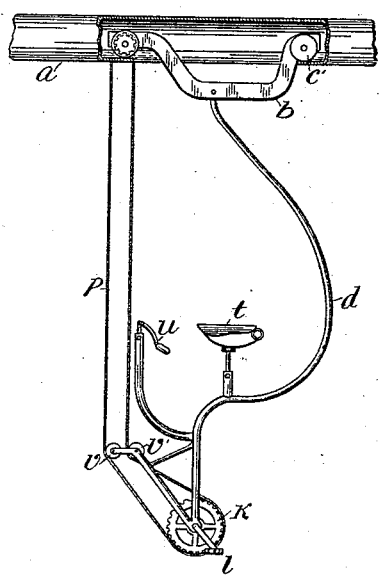
Figure 3:
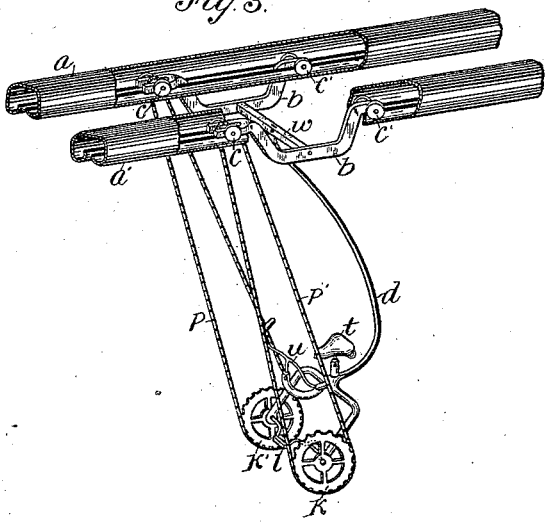
Figure 4:
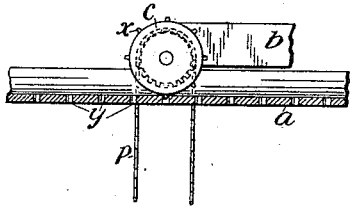

Figure 1 is a perspective view of a trolley track having a cycle suspended therefrom and provided with suitable propelling mechanism. Fig. 2 is a side elevation of a similar device adapted for propulsion in the manner of a bicycle. Fig. 3 illustrates a further modification wherein double tracks are employed, and Fig. 4 is a side elevation of a trolley track in section with the trolley wheel and part of the trolley frame arranged thereon.

In detail $a$ indicates the track; $b$, a trolley truck; $c$, trolley wheels; $d$, suspending rods; $e$ and $f$, adjusting rods; $g$, coupling; $h$, seat; $i$, forward portion of the framework; $j$, sprocket-chain; $k$, sprocket-wheel; $l$, crank-treadles; $m$, rear portion of frame; $n$, large rear sprocket wheel; $o$, small rear sprocket-wheel; $p$, rear sprocket chain; $r$, trolley sprocket-wheel; $s$, shell; $t$, saddle; $u$, handle bar; $v\,v'$, idlers; $x$, spurs on trolley sprocket-wheel, and $y$, openings in trolley rail.

The object of my invention is to provide a trolley cycle for use at seaside or other pleasure resorts so arranged that a person may propel themselves throughout the whole extent of the track.

The construction and operation of my device are as follows:—Mounted upon suitable supports is arranged the trolley track $a$. This may consist of a single track or of double tracks. A truck is arranged having suitable wheels which travel in or upon the track and from the truck I suspend a car or frame, upon which frame I mount suitable sprocket-wheels and cranks, so that by the revolution of the cranks the wheels of the truck are revolved and the car propelled.

In Fig. 1 I illustrate an arrangement of my device with a single trolley track, the truck $b$ being provided with four wheels $c\,c'$ and with a centrally arranged sprocket-wheel $r$. A frame $d$ is secured at its upper end to the truck $b$ and at its lower end is secured to the frame-work $i\,m$. At the forward end I mount a sprocket-wheel $k$ provided with suitable cranks and at the rear portion of the frame I mount a double sprocket wheel $o\,n$. A sprocket-chain $j$ passes from the sprocket-wheel $k$ to the sprocket-wheel $o$ and the sprocket-chain $p$ passes from the sprocket-wheel $n$ to the sprocket-wheel $r$. The crank motion is thus multiplied by the double sprocket-wheels. Any sort of seat $h$ is arranged upon the frame, and a brake-rod or lever is arranged in front in a position to be easily reached by the rider.

It will be seen that a person sitting upon the seat $h$ with his feet upon the crank-treadles $l$ may revolve the sprocket-wheel $k$ and thus cause the revolution of the other sprocket-wheels and hence the revolution of the axle upon which the wheels $c\,c'$ are mounted, thus causing the device to traverse the rail.

In Fig. 2 I illustrate a more simple form of construction it being arranged for a man to sit astride the saddle as with the ordinary bicycles, the sprocket-chain $p$ being carried around the idlers $v\,v'$ so that they will not interfere with the motion of the rider.

In Fig. 3 I illustrate a modification wherein a double track is shown, and in this case the employment of idlers is avoided, and the sprocket-wheel is mounted upon the forward axle of the truck instead of the rear axle as in the first instance. In this the treadles are arranged between the main sprocket-wheels as clearly illustrated in the drawings.

In Fig. 4 I illustrate a construction wherein the track may be arranged at any desired incline and slipping of the truck wheels will be avoided as they are provided with projecting pins $x$ which enter the recess $y$ in the track. This construction of truck wheels may be applied to any of the forms of trolley cycle construction.

Having, therefore, described my invention, what I claim, and desire to secure by Letters Patent, is—

1. The combination of two overhead tracks, a frame extending between the tracks, wheels carried by the frame and rolling on the tracks, a vehicle frame suspended from the overhead frame, a shaft and means for rotating the same on the depending frame, and an operative connection therefrom to one of the wheels to propel the vehicle, substantially as described.

2. The combination of two overhead tracks, a frame extending between the tracks, fore and aft wheels rolling on each track and carried by the frame, a frame depending from the overhead frame, a shaft and means for rotating the same on the depending frame, and operative connections from said shaft to one pair of said wheels, substantially as described 3. In a trolley cycle, the combination of two overhead tracks, suitable trucks having wheels mounted thereon, a sprocket wheel mounted upon a truck wheel axle, a suitable frame depending from said trucks, a sprocket wheel mounted upon said frame, means for operating the sprocket wheel, and a sprocket chain arranged to convey motion from the frame sprocket wheel to the sprocket wheel on the truck axle, substantially as described.

HENRY L. GARDNER.

Witnesses:
ALLEN WEBSTER,
E. C. STICKNEY.